United States Patent
Yin et al.

(10) Patent No.: US 8,451,839 B2
(45) Date of Patent: May 28, 2013

(54) METHOD AND APPARATUS FOR MANAGING ROUTE INFORMATION AND FORWARDING DATA IN ACCESS DEVICES

(75) Inventors: Qin Yin, Shanghai (CN); Yingzhong Miu, Shanghai (CN); Jianhua Zhu, Shanghai (CN); Yifeng Yao, Shanghai (CN)

(73) Assignee: Alcatel Lucent, Paris (FR)

( * ) Notice: Subject to any disclaimer, the term of this patent is extended or adjusted under 35 U.S.C. 154(b) by 322 days.

(21) Appl. No.: 12/310,660

(22) PCT Filed: Aug. 14, 2007

(86) PCT No.: PCT/CN2007/002449
§ 371 (c)(1),
(2), (4) Date: May 29, 2009

(87) PCT Pub. No.: WO2008/031319
PCT Pub. Date: Mar. 20, 2008

(65) Prior Publication Data
US 2009/0323693 A1 Dec. 31, 2009

(30) Foreign Application Priority Data
Sep. 7, 2006 (CN) .......................... 2006 1 0030926

(51) Int. Cl.
*H04L 12/56* (2006.01)
(52) U.S. Cl.
USPC ........................................................ 370/392
(58) Field of Classification Search
USPC ......... 370/351–357, 389, 392, 395.5–395.54, 370/464–467
See application file for complete search history.

(56) References Cited

U.S. PATENT DOCUMENTS

| | | | | |
|---|---|---|---|---|
| 5,922,049 A | * | 7/1999 | Radia et al. | 709/220 |
| 6,697,360 B1 | * | 2/2004 | Gai et al. | 370/389 |
| 7,385,973 B1 | * | 6/2008 | Johnson et al. | 370/389 |
| 2002/0138614 A1 | * | 9/2002 | Hall | 709/225 |
| 2006/0140164 A1 | | 6/2006 | Patel et al. | |
| 2008/0212598 A1 | * | 9/2008 | Kolli et al. | 370/409 |

FOREIGN PATENT DOCUMENTS

| | | |
|---|---|---|
| JP | 2002-217941 | 8/2002 |
| KR | 10-2004-0011936 | 2/2004 |

OTHER PUBLICATIONS

PowerConnect Application Note #38, What is VLAN Routing?, Dell, 5 pages, Feb. 2004.*

* cited by examiner

*Primary Examiner* — Frank Duong
(74) *Attorney, Agent, or Firm* — Harness, Dickey & Pierce, P.L.C.

(57) ABSTRACT

The present invention provides a method for creating routes in access devices of the communication network by using access response messages. With the method provided by the present invention, services can be distinguished and forwarded based on destination IP sub-networks, so that different services can be distributed in access devices. In this way, on the premise that services are distinguished based on layer 3, the requirements for access devices are reduced and layer 2 networks on the user side are not required to carry out route protocols, which decreases administrators' maintenance work and is the important condition for the realization of plug&play and reduces the requirements for marginal routers.

12 Claims, 6 Drawing Sheets

METHOD AND APPARATUS FOR MANAGING ROUTE INFORMATION AND FORWARDING DATA IN ACCESS DEVICES

TECHNICAL FIELD

The present invention relates to the communication network, particularly to the access network of the communication network.

BACKGROUND OF THE INVENTION

Currently, the requirements for layer 2 access devices put forward by telecom operators are higher and higher. Layer 2 devices are required to distinguish services based on layer 3 information, so that different services, such as audio, video, Internet and so on, can be distributed in access devices like the Digital Subscriber Line-Access Multiplexer (DSLAM) and access to corresponding service networks via gateways corresponding to different services. Concretely, operators will generally plan service networks in advance, and different service providers possess different IP addresses. In this way, access devices can distinguish and forward services based on destination IP sub-networks. However, common access devices are only layer 2 devices and not used as user gateways, therefore these access devices are transparent to users in the third layer. Moreover, they don't have dedicated IP addresses for forwarding data. Therefore, accordingly, the network can only create unnumbered IP interfaces to meet this requirement. And this is also used to cope with the requirement for saving IPv4 addresses which are becoming scarcer.

Presently, there is a method for creating route tables by monitoring route protocol messages. But operators normally don't enable route protocols on the ports on the user side. Route protocols based on link statuses (e.g. Open Shortest Path First) normally requires the correspondent node to have layer 3 addresses, however, this requirement can not be satisfied. Although route protocols based on distance vectors (e.g. Routing Information Protocol) are usable, restrictions are put forward when operators choose route protocols, and employing route protocols in the user-end network increases the complexity of the network and the load of the layer 2 network. Since layer 2 devices should support route protocols in this way, higher requirements are put forward for them.

Generally, it is very difficult for layer 2 devices to obtain layer 3 route information. Configuring each such access device statically not only leads to high work load, but also makes layer 2 devices lose their advantage of plug&play. Thus, this becomes a relative prominent problem.

The present invention proposes a method and an apparatus for distinguishing services and forwarding data based on destination IP sub-networks by creating routes on layer 2 devices via the use of access response messages generated by servers when terminal devices access to the network. Here, the access response message refers to the Dynamic Host Configuration Protocol (DHCP) response message. Below, a brief introduction will be made about the DHCP.

Dynamic Host Configuration Protocol (DHCP):

The DHCP can be divided into two parts: one is the server end, while the other is the client end. DHCP servers run centralized management of all IP network setting information, and are responsible for dealing with DHCP requirements of the client end; while the client end uses IP environment information assigned from servers.

1. Assignment Forms of DHCP

At first, there must be at least one DHCP server working in the network. It monitors DHCP requirements of the network and negotiates with the client end about the setting environment of TCP/IP. Two kinds of IP positioning ways are provided:

automatic assignment, its circumstance is: once the DHCP client end has successfully leased an IP address from the DHCP server for the first time, it will use this address for ever;

dynamic assignment: once the DHCP client end has leased an IP address from the DHCP server for the first time, it doesn't use this address for ever. As long as the lease expires, the client end should release this IP address, so as to provide it to other work stations. Of course, the client end can renew the lease with higher priorities than other hosts, or lease other IP addresses.

2. Work Principle of DHCP

Depending on whether it is the first time for the client end to log on the network, the working form of DHCP will be different. Below, the working form of DHCP when it is the first time for the client end to log on the network will be detailed described with reference to FIG. 1.

Logging on the network for the first time:

1) Searching Server. When the DHCP end client logs on the network for the first time, namely the client finds there is no IP information setting in the host, it will send a DHCPDISCOVER packet to the network. Since the client hasn't known to which network it belongs yet, the source address of the packet is 0.0.0.0, and the destination address is 255.255.255.255, then the packet is attached with DHCPDISCOVER information and broadcasted to the network.

Under the circumstances of the Windows default setting, the waiting time of DHCPDISCOVER is preset as 1 second, namely after the client end has sent the first DHCPDISCOVER packet, if no response is obtained within 1 second, the second DHCPDISCOVER broadcast will be performed. Under the circumstances that no response is obtained all along, the client end will conduct totally four DHCPDISCOVER broadcasts (including the first DHCPDISCOVER broadcast), the waiting time for the first broadcast is 1 second, and the waiting time for the other three broadcasts is 9 seconds, 13 seconds and 16 seconds respectively. If there is still no response of the DHCP server, the client end will display error information and declares the failure of DHCPDISCOVER. After that, based on the choice of the user, the system will continue to repeat the DHCPDISCOVER process once again after 5 minutes.

2) Providing an IP lease address. After the DHCP server has monitored the DHCPDISCOVER broadcast sent by the client end, it will choose the most front unleased IP address from the range of the addresses which have not been leased, together with other TCP/IP settings, to form a DHCPDISCOVER packet and sent the same to the client end as a response.

Since the client end doesn't have IP address at the beginning, there is MAC address information contained in the DHCPDISCOVER packet, and there is an XID number to identify this packet. Based on this information, the DHCPOFFER packet responded by the DHCP server is forwarded to the client needing the lease. According to the setting of the server end, the DHCPOFFER packet contains information of the lease term.

3) Accepting an IP lease. If the client end receives responses of multiple DHCP servers in the network, it will only choose one of the DHCPOFFERs (generally the one that arrives earliest), and send a DHCPREQUEST broadcast packet to the network in order to tell all DHCP servers that it will accept the IP address provided by which server.

At the same time, the client end will also send an ARP packet to the network to enquire whether there are any other hosts using this IP address in the network; if it is found that this IP address has been occupied, the client end will send a DHCPDECLINE packet to the DHCP server, so as to decline to accept its DHCPOFFER and resend a DHCPDISCOVER message.

4) Acknowledging the lease. After the DHCP server has received the DHCPREQUEST of the client end, it will send a DHCPACK response to the client end in order to acknowledge that the IP lease has come into effect formally, namely a whole DHCP working process is completed.

SUMMARY OF THE INVENTION

The object of the present invention is to provide a method, in access devices of the communication network, for making use of access response messages to create routes, so as to distinguish services and forward based on destination IP sub-networks and make different services distribute in access devices.

According to the first aspect of the present invention, there is provided a method for managing route information in an access device of the communication network. The method comprises the steps of: at first, receiving an access response message which is from the server and sent to a user terminal; then, extracting route-related information from said access response message, and creating or updating the route table based on said route-related information.

According to the second aspect of the present invention, there is provided a route management apparatus for managing route information in an access device of the communication network. The route management apparatus comprises a receiving means, a first obtaining means and a route maintenance means. The receiving means receives an access response message which is from the server and sent to a user terminal; the first obtaining means extracts route-related information from said access response information; the route maintenance means creates or updates the route table based on said route-related information.

According to the third aspect of the present invention, there is provided a method for forwarding data in an access device of the communication network, wherein data from user terminals belonging to different sub-networks is forwarded to corresponding sub-network gateways.

According to the fourth aspect of the present invention, there is provided a forwarding apparatus for forwarding data in an access device of the communication network, wherein data from user terminals belonging to different sub-networks is forwarded to corresponding sub network gateways.

As compared with the prior art, the present invention has following advantages:

1. Not influencing the choice of route protocols;
2. Not requiring layer 2 network on the user side to execute route protocols;
3. Reducing the requirements for the marginal routers;
4. Reducing the maintenance work of administrators, which is the important condition for realizing plug&play;
5. Under the premise that services are distinguished based on layer 3, reducing the requirements for access devices.

BRIEF DESCRIPTION OF THE DRAWINGS

Other features, objects and advantages of the present invention will be apparent by reading the following detailed description of non-limiting exemplary embodiments with reference to appended drawings.

DETAILED DESCRIPTION OF THE EMBODIMENTS

Figure 1A:
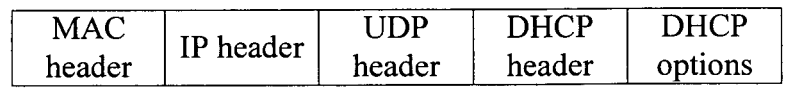
FIG. 1a illustrates the frame structure of DHCP.
Figure 1B:
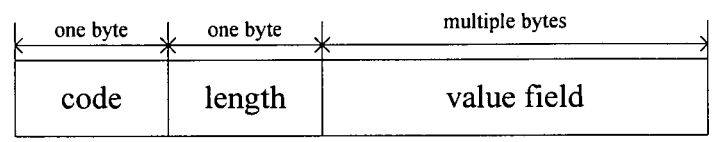
FIG. 1b illustrates the option structure in the frame structure of DHCP.

FIG. 1a illustrates the encapsulation format of a DHCP packet. All DHCP messages are encapsulated in UDP packets. The options in DHCP are vendor-specific area, so as to provide more setting information (e.g. Netmask, Gateway, DNS, etc.), and its length can be variable and there can be multiple options at the same time. The first byte of each option is the option code, its subsequent byte shows the length of the option content hereafter, and the rest is the option content, such as the option format in a DHCP message shown in FIG. 1b. DHCP employs the option code 0x53 to set the packet type: 1 represents DHCP-DISCOVER, 2 represents DHCP-OFFER, 3 represents DHCP-REQUEST, 4 represents DHCP-DECLINE, 5 represents DHCP-ACK, 6 represents DHCP-NACK and 7 represents DHCP-RELEASE.

In the DHCP standard, three static route-related options are defined: option 3, option 33 and option 121. Wherein, option 3 is used to declare the gateway corresponding to the client. There can be multiple gateways in correspondence with the client, which are ordered according to the priority. Option 33 is put forward relative early, and is used to declare static type route information. Option 121 comprises the former two. It declares all static routes, including default routes, and supports Classless Inter-Domain Routing. These options are configured to the client end at the same time when the server is assigning IP addresses, so that the client end can create the route table correctly. It is worth noting that, for the whole network, user gateways and planed addresses of service providers are not often changed. They are located at two ends of the IP addresses and are the end points of the network topology and won't change with the network topology. Therefore, these routes can be regarded as static and can be pre-configured in the server by administrators. The configuration load is also not very large.

For an access device, it is located between the marginal router and the user and won't be influenced by the topology change. Hence, these static routes are sufficient for the access device.

Considering the current situation of the network, Classless Inter-Domain Routing has been widely used. An access device should learn and maintain the upstream route mainly depending on monitoring option 121 in each DHCP-ACK packet.

Below, the present invention will be further elucidated in conjunction with FIG. 2 to FIG. 6.

Figure 2:
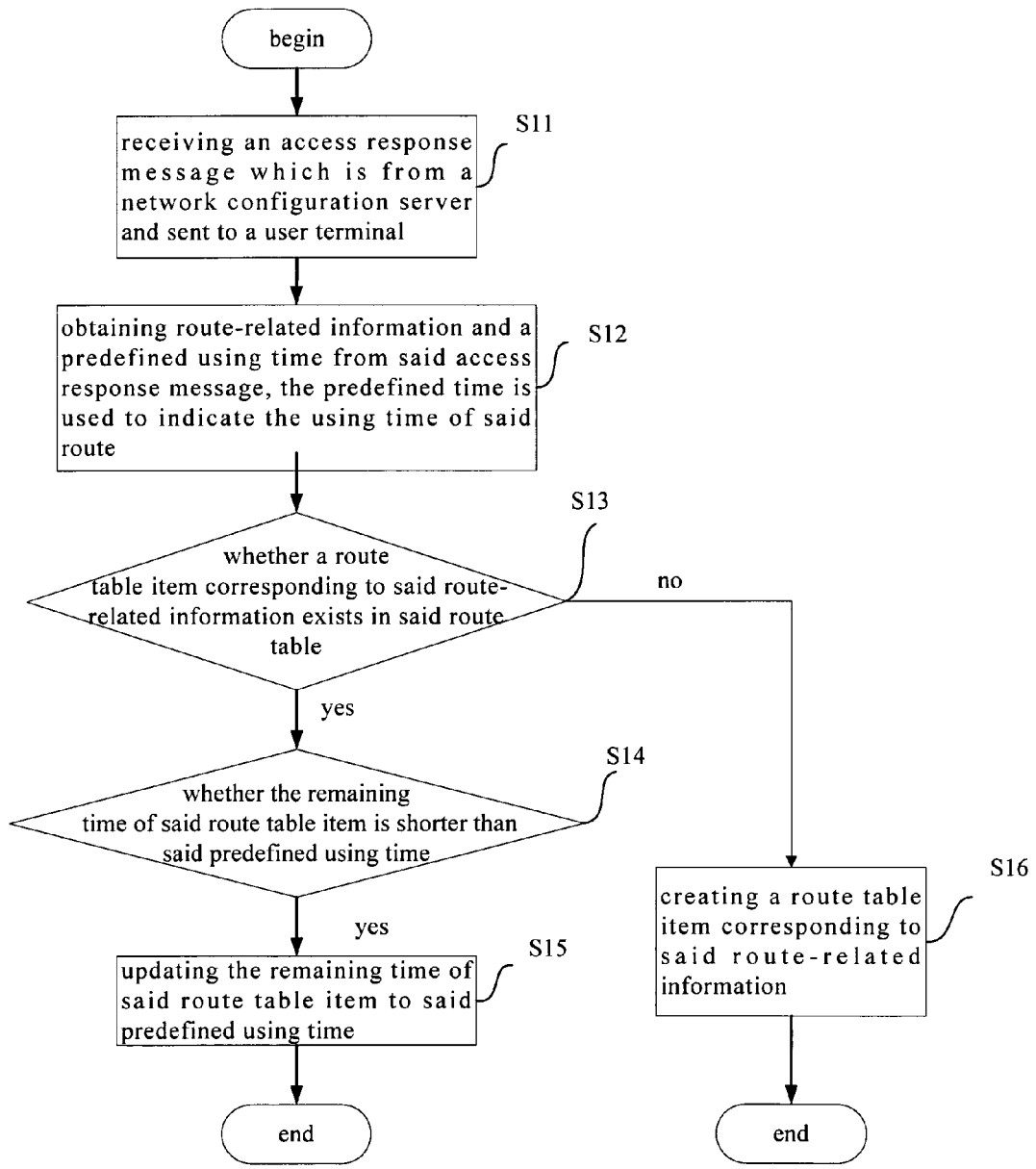
FIG. 2 illustrates the flowchart of the method for managing route information in an access device of the communication network according to an embodiment of the present invention.

FIG. 2 illustrates the flowchart of the method for managing route information in an access device of the communication network according to an embodiment of the present invention.

At first, in step S11, an access response message which is from a server and sent to a user terminal is received.

Then, in step S12, route-related information is extracted from said route-related message.

Finally, a route table item is created or updated based on said route-related information.

If said access response message further comprises the predefined using time indicating the time which can be used by said route, then in step S12, said predefined using time is obtained simultaneously; finally, the route table item is updated or created in conjunction with said route-related information and said predefined using time.

Wherein the step in which said route table item is updated or created can be concretely divided into steps S13, S14, S15 and S16.

At first, in step S13, judging whether a route table item corresponding to said route-related information exists in said route table.

If a route table item corresponding to said route-related information exists in said route table, then in step S14, judging whether the remaining time of said route table item is shorter than said predefined using time.

If the remaining time of said route table item is shorter than said predefined using time, then updating the remaining time of said route item to the said predefined using time.

If no route table item corresponding to said route-related information exists in said route table, then in step S16, creating a route-related item corresponding to said route-related information.

If the virtual local area network (VLAN) configuration is employed between an access device and each sub-network gateway (also referred to as a marginal router) connected with the access device, correlated information of said route table item and the VLAN is obtained from the address resolution protocol (ARP) message or the access response message.

Figure 3A:
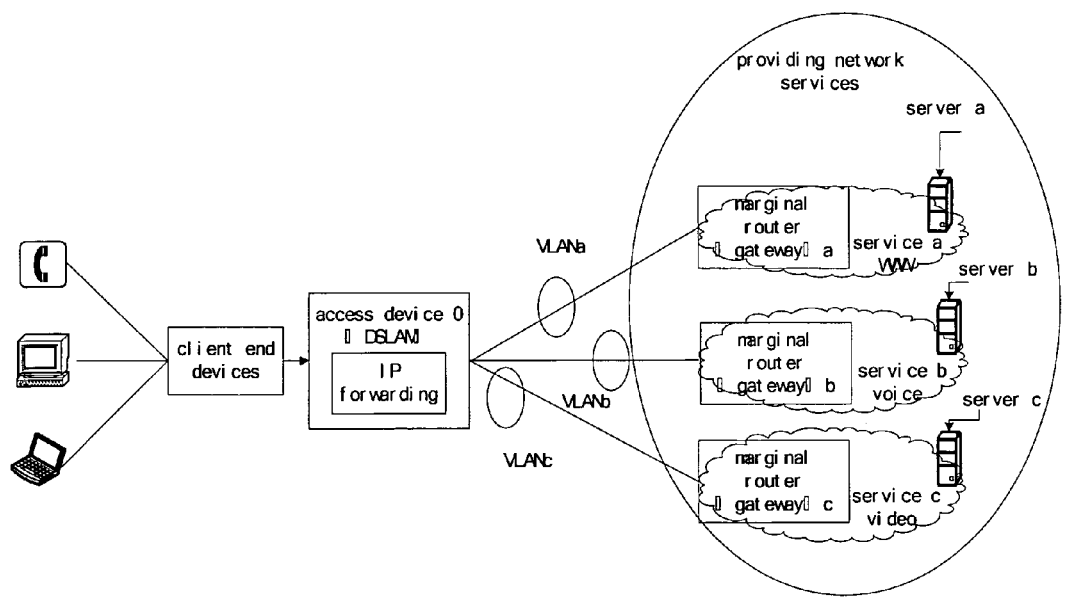
FIG. 3a illustrates a network topological structure of the access network according to an embodiment of the present invention.
Figure 3B:
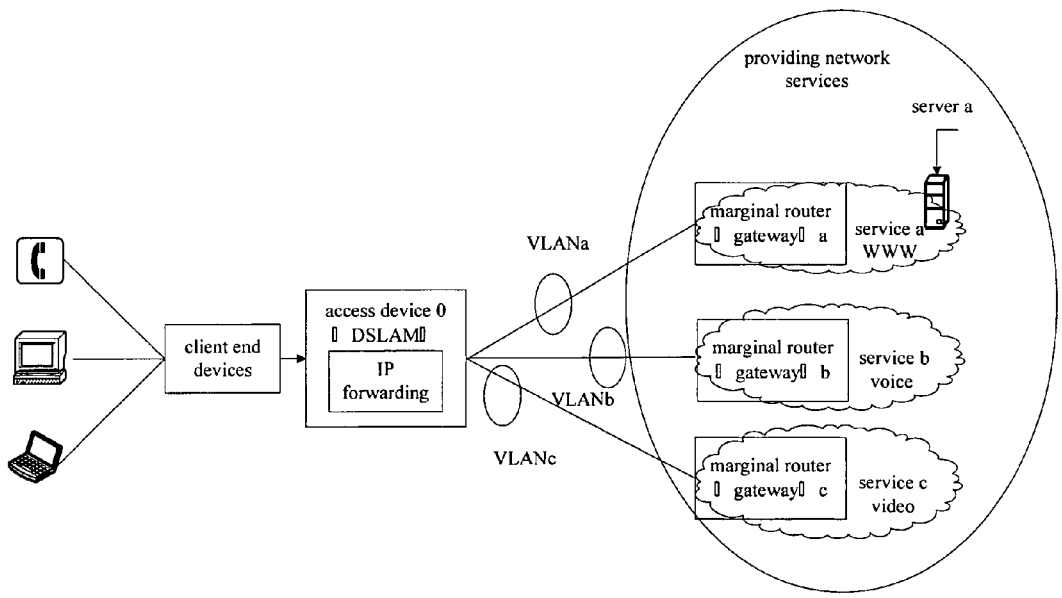
FIG. 3b illustrates another network topological structure of the access network according to an embodiment of the present invention.

FIGS. 3a and 3b illustrates two network topological structures of the access network according to an embodiment of the present invention. In FIG. 3a, each VLAN has a server responding to user access requests. In FIG. 3b, three VLANs share a server responding to user access requests.

In general cases, such as the network topological structure graphs shown in FIGS. 3a and 3b, the access device 0 can obtain information of the VLAN via the VLAN tag in the acknowledgment frame of the ARP from each sub-network gateway, and correlate the information with corresponding route. The detailed flow is as below: at first, the access device 0 receives a packet from a user device. Assume that the packet is sent to the service a (world wide web). Based on the source network address and the destination network address in the packet, the access device 0 finds the destination network address of the next hop of the forwarding, then sends a ARP request frame to the host of the next hop (namely the marginal route a shown in FIGS. 3a and 3b) so as to inquire its link layer address. After receiving this request, the host of the next hop responds with an ARP response frame comprising a VLAN tag. When receiving said ARP response frame comprising a VLAN tag, the access device 0 extracts the information of the VLAN and correlates it with the route.

If there is one (or more) server(s) in each VLAN which responds to user access requests, as shown in FIG. 3a, under such network configuration, information of the VLAN can also be obtained by the VLAN tag in an access response message, and then correlated with the route-related information. If multiple VLANs share one server responding to user access requests, as shown in FIG. 3b, then the VLAN information correlated with the route-related information can not be obtained via the VLAN tag in the access response message. At this time, the VLAN information correlated with the route-related information can only be obtained by the ARP message.

In current network realizations, aforesaid access request message and access response message are DHCP messages, and said predefined using time is the lease time in the DHCP message.

Figure 4:
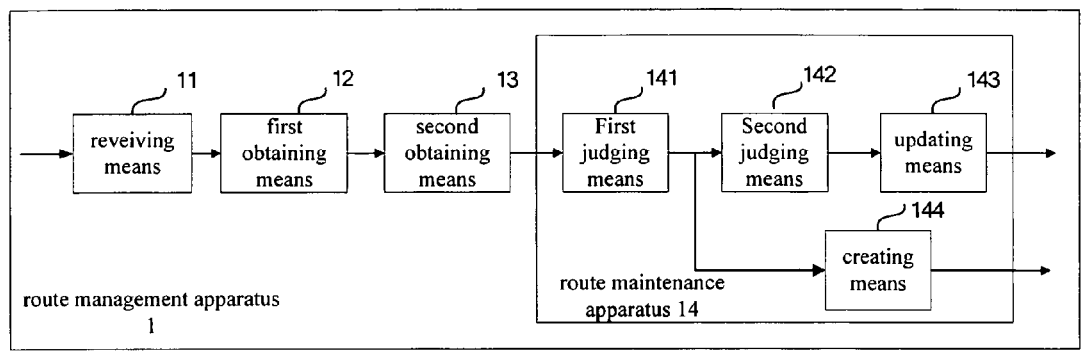
FIG. 4 illustrates the block diagram of the route management apparatus for managing route information in an access device of the communication network according to an embodiment of the present invention.

FIG. 4 illustrates the block diagram of the route management apparatus 1 for managing route information in an access device of the communication network according to an embodiment of the present invention. The route management apparatus 1 comprises a receiving means 11, a first obtaining means 12, a second obtaining means 13 and a route maintenance means 14. Wherein the route maintenance means 14 comprises a first judging means 141, a second judging means 142, an updating means 143 and a creating means 144.

At first, the receiving means 11 receives an access response message which is from the server end and sent to the terminal.

Then, the first obtaining means 12 obtains said route-related information from said access response message and obtains a predefined using time at the same time. The predefined using time is used to indicate the using time of said route.

If the VLAN configuration is employed between an access device and each sub-network gateway (also referred to as a marginal router) connected with the access device, the second obtaining means 13 obtains the correlated information of said route table item and the VLAN from the ARP message or the access response message.

In general cases, as shown in FIGS. 3a and 3b, the information of the VLAN can be obtained via the VLAN tag in the acknowledgment frame of the ARP from each sub-network gateway, and correlate the information with corresponding route. The detailed flow is as below: at first, the access device 0 receives a packet from a user device. Assume that the packet is sent to the service a (world wide web). Based on the source network address and the destination network address in the packet, the access device 0 finds the destination network address of the next hop of the forwarding, then sends a ARP request frame to the host of the next hop (namely the marginal route a shown in FIGS. 3a and 3b) so as to inquire its link layer address. After receiving this request, the host of the next hop responds with an ARP response frame comprising a VLAN tag. When receiving said ARP response frame comprising a VLAN tag, the access device 0 extracts the information of the VLAN and correlates it with the route.

If there is one (or more) server(s) in each VLAN which responds to user access requests, as shown in FIG. 3a, under such network configuration, information of the VLAN can also be obtained by the VLAN tag in the access response message, and then correlated with the route-related information. If multiple VLANs share one server responding to user access requests, as shown in FIG. 3b, then the VLAN information correlated with the route-related information can not be obtained via the VLAN tag in the access response message. At this time, the VLAN information correlated with the route-related information can only be obtained by the ARP message.

Finally, the route maintenance means 14 creates or updates the route table based on said route-related information.

In a preferred embodiment of the route maintenance means 14, according to the route-related information, the predefined using time obtained by the first obtaining means 12 and the VLAN information obtained by the second obtaining means 13, the first judging means 141 first judges whether a route table item corresponding to said route-related information exists in said route table.

If a route table item corresponding to said route-related information exists in said route table, the second judging means 142 judges whether the remaining time in said route table item is shorter than said predefined using time.

If a route table item corresponding to said route-related information exists in said route table and the remaining time in said route table item is shorter than said predefined using time, the updating means 143 updates the remaining time of said route table item to the predefined using time.

If no route table item corresponding to said route-related information exists in said route table, the creating means 144 creates a route table item corresponding to said route-related information.

In current network realizations, aforesaid access request message and access response message are DHCP messages, and said predefined using time is the lease time in the DHCP message.

Figure 5:
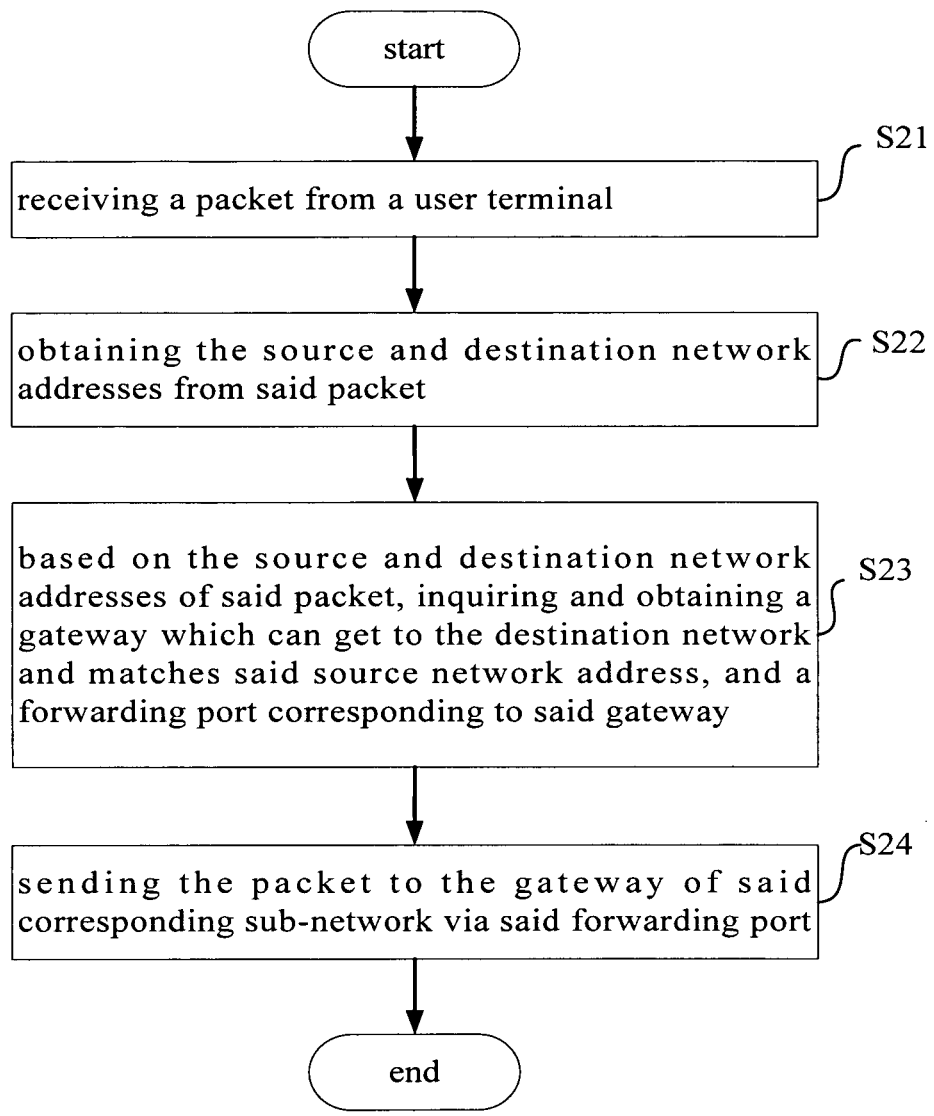
FIG. 5 illustrates the flowchart of the method for forwarding data in an access device of the communication network according to an embodiment of the present invention.

FIG. 5 illustrates the flowchart of the method for forwarding data in an access device of the communication network according to an embodiment of the present invention. The method consists in that data from user terminals belonging to different sub-networks is forwarded to corresponding sub-network gateway. As shown in FIG. 5, the method can be divided into four steps.

At first, in step S21, a packet from a user terminal is received.

Then, in step S22, the source network address and the destination network address are obtained from the packet.

After that, in step S23, based on the source network address and the destination network address of said packet, a gateway which can get to the destination network and matches the source network address is inquired from the route table. In addition, the forwarding port corresponding to said gateway is also obtained.

Finally, in step S24, the packet is sent to the gateway of said corresponding sub-network via said forwarding port.

In current network realizations, aforesaid network addresses are IP addresses.

In a preferred embodiment, an access device maintains a sub-network route table respectively for each sub-network. At first, a packet from a user terminal is received; then, based on the source IP address of said packet, a corresponding sub-network route table is inquired; after that, based on the destination IP address of said packet, the corresponding route table item is inquired from said corresponding sub-network route table, so as to determine the forwarding port of said packet; finally, the packet is sent to the gateway of said corresponding sub-network via said forwarding port.

In another preferred embodiment, an access device only maintains one route table. At first, a packet coming from a user terminal is received; then based on the destination IP address of said packet, one or more route table items correlated with said destination address are inquired from said route table; after that, by using the source IP address of said packet, the route table item corresponding to the gateway belonging to its sub-network is determined from said one or more route table items correlated with said destination address, and the forwarding port of said packet is also determined; finally, the packet is sent to said corresponding sub-network's gateway via said forwarding port.

Figure 6:
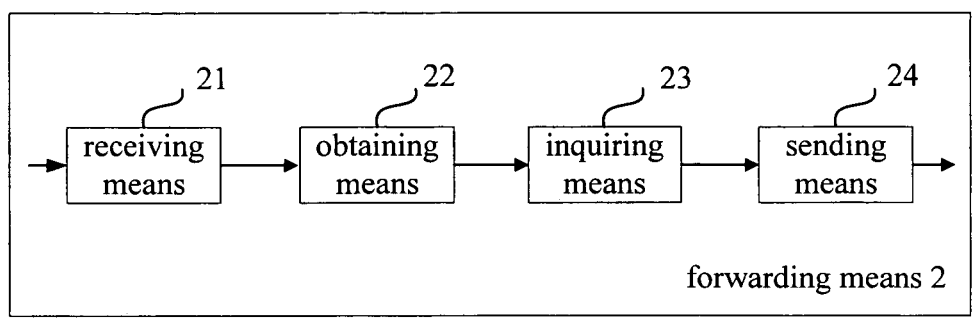
FIG. 6 illustrates the block diagram of the forwarding apparatus for forwarding data in an access device of the communication network according to an embodiment of the present invention.

FIG. 6 illustrates the block diagram of the forwarding apparatus 2 for forwarding data in an access device of the communication network according to an embodiment of the invention. The forwarding apparatus 2 forwards data from user terminals of different sub-networks to the gateways of corresponding sub-networks.

The forwarding apparatus comprises a receiving means 21, an obtaining means 22, an inquiring means 23 and a sending means 24.

At first, the receiving means 21 receives a packet from a user terminal.

Then, the obtaining means 22 obtains the source network address and the destination network address from said packet.

After that, based on the source network address and the destination network address of said packet, the inquiring means 23 inquires a gateway from the route table which can get to the destination network and match the source network address, and a forwarding port corresponding to said gateway.

Finally, the sending means 24 sends said packet to the gateway of said corresponding sub-network via said forwarding port.

In current network realizations, aforesaid network addresses are IP addresses.

In a preferred embodiment, an access device maintains a sub-network route table respectively for each sub-network. At first, the receiving means 21 receives a packet from a user terminal; then, the obtaining means 22 obtains the source network address and the destination network address from said packet; after that, based on the destination IP address of said packet, the inquiring means 23 inquires its corresponding sub-network route table; and then, based on the destination IP address of said packet, the inquiring means 23 inquires the corresponding route table item from said corresponding sub-network route table, so as to determine the forwarding port of said packet; finally, the sending means 24 sends said packet to the gateway of said corresponding sub-network via said forwarding port.

In another preferred embodiment, an access device only maintains one route table. At first, the receiving means 21 receives a packet coming from a user terminal; then, the obtaining means 22 obtains the source network address and the destination network address from said packet; after that, based on the destination IP address of said packet, the inquiring means 23 inquires one or more route table items correlated with said destination address from said route table; afterwards, by using the source IP address of said packet, the route table item corresponding to the gateway belonging to its sub-network is determined from said one or more route table items correlated with said destination address, and the forwarding port of said packet is also determined; finally, the sending means sends said packet to the gateway said corresponding sub-network via said forwarding port.

Above, embodiments of the present invention have been described. It should be understood that the present invention is not limited to aforementioned specific embodiments. Those skilled in the art can make various variations and modifications within the scope of the appended claims.

What is claimed is:

1. A method, in an access device of the communication network, for managing route information, comprising:
   receiving an access response message from a server;
   obtaining route-related information and a predefined using time from said access response message, said predefined using time indicates a using time of said route; and
   updating a route table item in a route table based on said route-related information and said predefined using time.

2. The method according to claim 1, wherein said access device is a Layer 2 access device.

3. The method according to claim 1, further comprising:
   determining whether the route table item corresponding to said route-related information exists in said route table;
   updating a remaining time of the route table item if the determining determines that the route table item corresponding to said route-related information exists in said route table and the remaining time of said route table item is shorter than said predefined using time; and
   creating a route table item corresponding to the route-related information if the determining determines that the route table item corresponding to said route-related information does not exist in the route table.

4. The method according to claim 1, further comprising:
   obtaining correlated information of said route table item and a virtual local area network from an address resolution protocol message or an access response message;
   wherein said virtual local area network configuration is employed between said access device and each marginal router connected with said access device.

5. The method according to claim 1, wherein said access response message refers to a dynamic host configuration protocol response message, said predefined using time refers to the lease time in said dynamic host configuration protocol response message.

6. A route management apparatus, in an access device of the communication network, for managing route information, comprising:
   a receiver configured to receive an access response message from a server;
   a first obtainer configured to obtain route-related information and a predefined using time from said access response message, said predefined using time indicating the using time of said route; and
   a route maintainer configured to update a route table based on said route-related information and said predefined using time.

7. The apparatus according to claim 6, wherein said access device is a Layer 2 access device.

8. The apparatus according to claim 6, wherein said route maintainer includes:
   a first judger configured to judge whether the route table item corresponding to said route-related information exists in said route table;
   a second judger configured to judge whether a remaining time of said route table item is shorter than said predefined using time if the first judger judges that the route table item corresponding to said route-related information exists in said route table;
   an updater configured to update the remaining time of said route table item to said predefined using time if the first judger judges that the route table item corresponding to said route-related information exists in said route table and the second judger judges that the remaining time of said route table item is shorter than said predefined using time;
   a creator configured to create the route table item corresponding to said route-related information if the first judger judges that no route table item corresponding to said route-related information exists in said route table.

9. The apparatus according to claim 6, further comprising:
   a second obtainer configured to obtain correlated information of said route table item and a virtual local area network;
   wherein, said virtual local area network configuration is employed between said access device and each marginal routers connected with said access device.

10. The apparatus according to claim 6, wherein said access response message refers to a dynamic host configuration protocol, said predefined using time refers to the lease time in said dynamic host configuration protocol response message.

11. An access device in the communication network, wherein said access device comprises a route management apparatus according to claim 6.

12. The device according to claim 11, wherein said access device is a digital subscriber line-access multiplexer.

* * * * *